M. M. WOOD.
PORTABLE TRUCK.
APPLICATION FILED APR. 25, 1921.
1,422,730. Patented July 11, 1922.
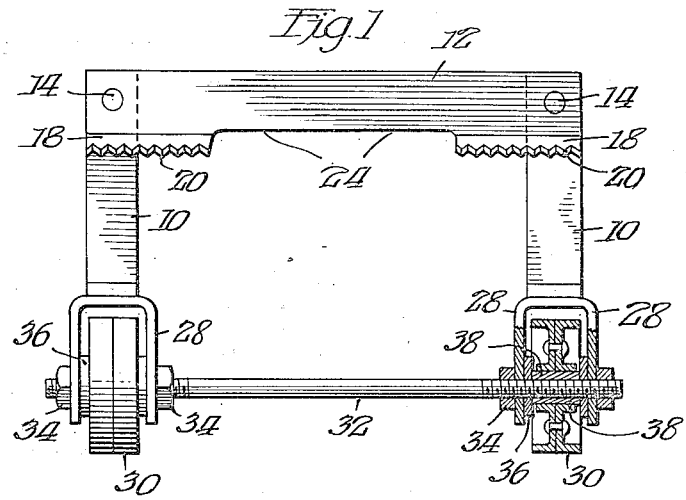
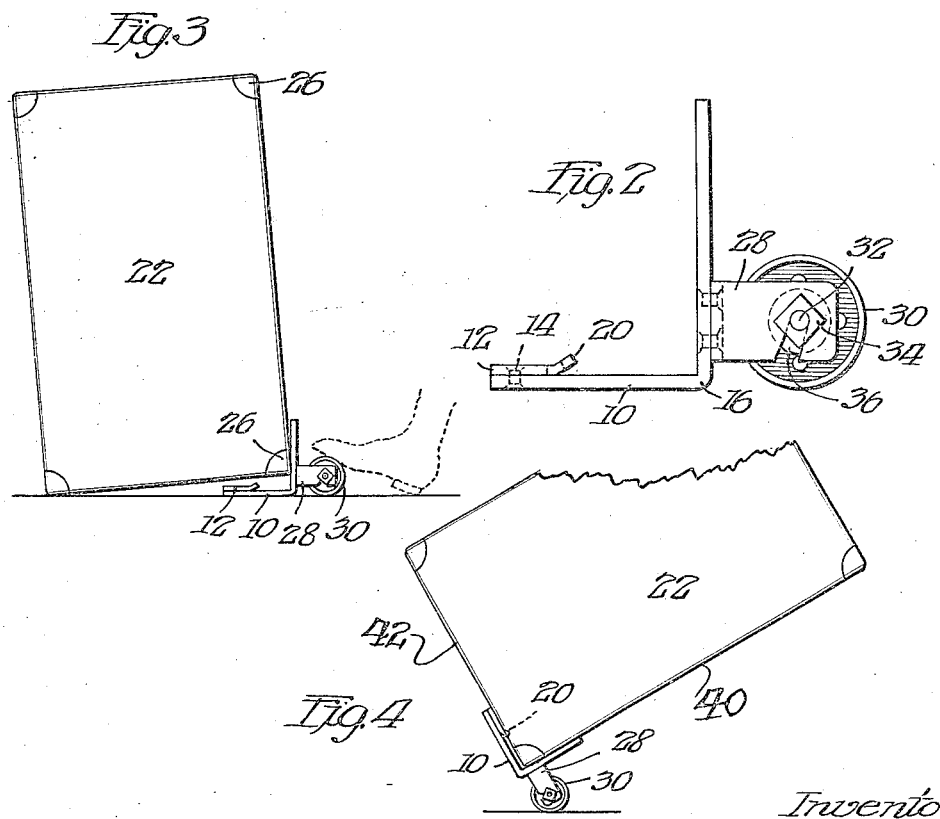
Inventor:
Montraville M. Wood,
By Cheever & Cox
attys.

UNITED STATES PATENT OFFICE.

MONTRAVILLE M. WOOD, OF BERWYN, ILLINOIS.

PORTABLE TRUCK.

1,422,730.  Specification of Letters Patent.  Patented July 11, 1922.

Application filed April 25, 1921. Serial No. 464,362.

*To all whom it may concern:*

Be it known that I, MONTRAVILLE M. WOOD, a citizen of the United States, residing at Berwyn, in the county of Cook and State of Illinois, have invented a certain new and useful Improvement in Portable Trucks, of which the following is a specification.

This invention is a small portable truck suitable for carrying in a trunk or suit case by means of which a professional traveling man can conveniently move his own trunks around a room or elsewhere without calling on a porter for assistance with consequent delay and tips.

The object is to provide a strong, cheap, light device of this class.

The invention consists in mechanism attaining the foregoing and other objects and in special features and details of construction more fully set forth in the specification and claims.

In the drawing, where similar numerals indicate the same parts throughout the several views, Figure 1 is a side elevation partly in section of means illustrating this invention in its preferred form.

Figure 2 is a side but changed position view of the parts of Figure 1.

Figure 3 shows the use of the mechanism of Figure 2 in the act of applying it to a trunk or other article to be transported.

Figure 4 is a changed position view of Figure 3, showing the actual transporting of the trunk.

The truck is made up of two right angular frame members 10 spaced about eight inches or so apart by a cross bar 12 conveniently secured in place as by rivets 14.

Bar 12 is, at its lower edge, or one toward angle 16, provided with an outwardly turned flange serrated at its ends in sharp teeth 20 adapted to bite into the trunk 22 to be carried. The bar is cut away in its middle portion 24 to clear any projecting metal corners on the trunk should it be necessary to engage the trunk at its corner.

The arms of members 10 opposite to where bar 12 is attached are provided near angle 16 with U-shaped wheel frames 28 within each of which is located a small caster wheel 30, journaled on a shaft 32, passing through frames 28 and detachably positioned by nuts 34 and washers 36. The wheels 30 are preferably of the roller skate type and very strong for size so that the truck has no difficulty with a five hundred pound trunk particularly if the wheels are equipped with roller bearings such as 38.

In the operation of the device the operator first places the truck on the floor in the position of Figure 2; then slips it under the edge of the trunk, box, barrel, or other object in the position of Figure 3 and then swings the load to be carried and consequently the truck to the position of Figure 4 and rolls it off to the point desired where the operation is reversed and the trunk removed in this position the trunk or package 22 has two bottom faces 40 and 42, which the angular members 10 embrace and contact thereby safely supporting the trunk or other load.

When the load is in the position of Figure 4 the teeth 20 dig into the load and temporarily firmly attach the truck to the load. Ordinarily the teeth 20 merely hook over a metal binding 26 which is commonly found on trunks or over the lower hoop of a barrel being transported.

In the actual commercial device the arms of angles 10 are not over three inches in length and the whole device only weighs a few pounds so that it can be readily packed and carried about. In actual practice one has actually been so carried for a year with great success.

Having thus described my invention, what I claim as new and desire to secure by Letters Patent, is:

1. In a device of the class described two small angle members, a truck wheel supporting each, a bar connecting the angle members having an angularly turned serrated edge for application to a trunk edge, for the purposes set forth.

2. In a device of the class described two small angle members, a truck wheel supporting each, a bar connecting the angle members having an angularly turned serrated edge for application to a trunk edge, said serrated edge being cut away in the middle portion of the bar, for the purposes set forth.

3. In a device of the class described, two angle irons, having arms about three inches long placed parallel to each other, a bar about eight inches long connecting the ends of two of the arms, wheels carried by the other arms near the angular points and roughened flanges on the end portions of the bar pointing toward the opposite angle arm, all the parts arranged as shown and described, for the purposes set forth.

In witness whereof, I have hereunto subscribed my name in the presence of two witnesses.

MONTRAVILLE M. WOOD.

Witnesses:
 DWIGHT B. CHEEVER,
 VELMA GRIFFITH.